Dec. 21, 1926.
J. JANUSEK
1,611,589
CORE FOR WREATHS
Filed Oct. 7, 1924
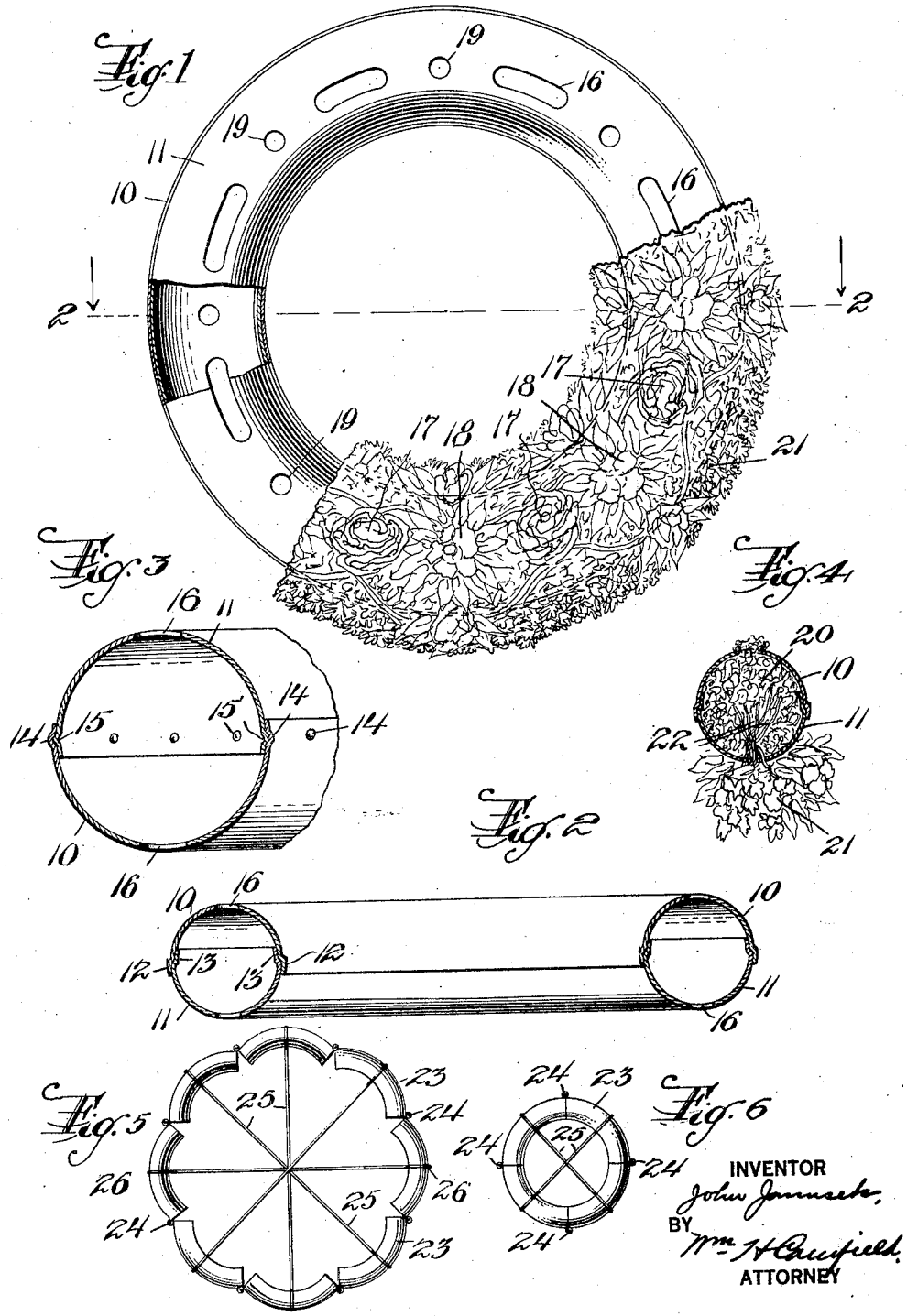

Patented Dec. 21, 1926.

1,611,589

UNITED STATES PATENT OFFICE.

JOHN JANUSEK, OF NEWARK, NEW JERSEY.

CORE FOR WREATHS.

Application filed October 7, 1924. Serial No. 742,101.

This invention relates to an improved core for wreaths and is designed to be used in wreaths of either the immortelle or so-called "straw-flower" makeup or in those in which cut flowers are used. In the former case the core is used for anchoring the strand of dry material that is wrapped around the core or it can be used as an anchor for wires used in binding flowers and leaves to the core. The core acts also as a receiver for moss or similar moisture retaining material and thus keeps cut flowers fresh over a considerable period.

The invention also resides in a core of this kind in which the pieces are arranged end to end, and are separable for the insertion or removal of pieces so that the size and shape of the wreath can be varied at will.

The invention is illustrated in the accompanying drawing in which Figure 1 is a face view of an improved core made according to my invention, the core being partly covered by the wreath and partly in section to show the interior. Figure 2 is a section on line 2—2 in Figure 1. Figure 3 is a detail section of a modification. Figure 4 is a detail section of Figure 1 showing the core with a filling therein. Figures 5 and 6 are face views of a core made up in the adjustable form.

The core is made up of two trough-like members 10 and 11 which can be made of any suitable material but are preferably made of sheet metal, usually tin because it is light. These members are placed face to face so that they form an annular chamber between them when they are assembled and while they may be made of various shapes, I show the wreath illustrated in Figures 1 to 4 as being circular.

The two members 10 and 11 can be made so that they are readily assembled and usually one of them has flanges 12 that receive the edges 13 of the other member so that they are held in register while they are being wound with the material which forms the body of the wreath.

If desired, the members may be held together against accidental separation by punched portions 14 in one member to receive similar projecting or punched portions 15 in the other member. The two halves when put together form a core around which may be wrapped either material already arranged as a strand such as the straw flower of immortelle type used principally for Christmas wreaths or material can be fastened on in the form of cut flowers or the like while wire is passed around the core as in funeral pieces and for the purpose of forming an anchorage into which one end of the wire or the strand of flower can be secured, I arrange perforations 16 in at least one of the members, preferably in both of them, and they are arranged symmetrically, that is, they are spaced apart around the face of the core so that if flowers as at 17 are to be arranged equidistant, this can be done by simply gauging where they are to be placed when the wreath is made by arranging each one over an opening or perforation 16. Flowers, such as 18, can be similarly spaced if necessary by the arrangement of another set of perforations 19.

When the flowers are cut flowers, they can be made to last longer by using the hollow receptacle formed in the core as a means for carrying a filling 20, of moss or similar material and the flowers 21 arranged on the outside of the wreath have their stems 22 arranged in the moss. The whole device can then be dipped in water and well saturated and will then last much longer than an ordinary wreath because the filling 22 is then closed and evaporation therefrom is slow.

If desired, the wreath can be made of pieces 23 hinged together as at 24, these hinge connections being separable as by having the pintle loosely fitted. These pieces 23 are shown in Figure 6 to the number of four, each being arc-shaped and extending for a distance of 90° so that when assembled they form a circle.

Wires 25 brace the wreath, such wires being stiff enough to form a support when necessary for the inside space of the wreath when flowers are to be placed therein. In Figure 5, I show the use of two of the devices shown in Figure 6 joined together by means of their easily attached and detached hinged members, and, of course, in this case the bracing bars 25 are made longer and are looped at their ends as at 26 to hold the opposed members of the design against folding inward. In this way any number of pieces can be arranged in the core and the diameter thereof gauged accordingly.

I claim:

A core of wreaths comprising arc-shaped pieces hinged end to end, separable hinge members connecting the pieces, and retaining strips adapted to extend across the core and connect the pieces to retain a desired shape and size of core.

In testimony that I claim the foregoing, I have hereto set my hand, this 23rd day of September, 1924.

JOHN JANUSEK.